United States Patent
Gutsol et al.

(10) Patent No.: US 7,867,457 B2
(45) Date of Patent: Jan. 11, 2011

(54) PLASMA REACTOR FOR THE PRODUCTION OF HYDROGEN-RICH GAS

(75) Inventors: Alexander Gutsol, Malvern, PA (US); Alexander Fridman, Marlton, NJ (US); Young I. Cho, Marlton, NJ (US); Lawrence Kennedy, Dublin, OH (US); Alexei Saveliev, Chicago, IL (US); Tecle S. Rufael, Stafford, TX (US); Vijay A. Deshpande, Houston, TX (US)

(73) Assignees: Drexel University, Philadelphia, PA (US); Chevron U.S.A., Inc., San Ramon, CA (US); Board of Trustees of the University of Illinois, Urbana, IL (US)

( * ) Notice: Subject to any disclaimer, the term of this patent is extended or adjusted under 35 U.S.C. 154(b) by 1148 days.

(21) Appl. No.: 10/560,439

(22) PCT Filed: Jun. 18, 2004

(86) PCT No.: PCT/US2004/019589
§ 371 (c)(1), (2), (4) Date: Jul. 24, 2006

(87) PCT Pub. No.: WO2004/112950
PCT Pub. Date: Dec. 29, 2004

(65) Prior Publication Data
US 2006/0266637 A1     Nov. 30, 2006

Related U.S. Application Data

(60) Provisional application No. 60/480,132, filed on Jun. 20, 2003.

(51) Int. Cl.
*B01J 19/08* (2006.01)
*C01B 3/24* (2006.01)

(52) U.S. Cl. ............ 422/186.21; 422/186.26; 423/650

(58) Field of Classification Search ............ 422/186.21, 422/186.22, 186.26; 123/3; 423/650
See application file for complete search history.

(56) References Cited

U.S. PATENT DOCUMENTS

| | | | |
|---|---|---|---|
| 4,801,435 A | 1/1989 | Tylko | 422/186.04 |
| 4,995,805 A * | 2/1991 | Hilliard | 431/10 |
| 5,374,802 A | 12/1994 | Dorfman et al. | 219/121.52 |
| 5,425,332 A | 6/1995 | Rabinovich et al. | 123/3 |
| 5,437,250 A * | 8/1995 | Rabinovich et al. | 123/3 |
| 5,847,353 A | 12/1998 | Titus et al. | 219/121.36 |
| 5,887,554 A | 3/1999 | Cohn et al. | 123/3 |
| 5,993,761 A | 11/1999 | Czernichowski et al. | 423/210 |

(Continued)

Primary Examiner—Kishor Mayekar
(74) Attorney, Agent, or Firm—Woodcock Washburn, LLP

(57) ABSTRACT

A plasma reactor (10) is provided. The plasma reactor (10) includes a reaction chamber (12) formed by a wall (13). Proximate to the first end of the reaction chamber, the plasma reactor includes a feed gas inlet (14) for creating a reverse vortex gas flow (16) in the reaction chamber. The plasma reactor (10) also includes an anode and a cathode connected to a power source for generation of an electric arc for plasma generation in said reaction chamber. The plasma reactor (10) may optionally include a movable electrode adapted for movement from a first, ignition position to a second, operational position in the reaction chamber. Also provided is a method of converting light hydrocarbons to hydrogen-rich gas, using the plasma reactor of the invention.

17 Claims, 13 Drawing Sheets

U.S. PATENT DOCUMENTS

| | | |
|---|---|---|
| 6,007,742 A | 12/1999 | Czernichowski et al. .... 252/372 |
| 6,245,309 B1 | 6/2001 | Etievant et al. ............. 423/248 |
| 6,322,757 B1 | 11/2001 | Cohn et al. ............ 422/186.04 |
| 6,363,716 B1 | 4/2002 | Balko et al. .................... 60/286 |
| 6,396,213 B1 | 5/2002 | Koloc .................... 315/111.21 |
| 6,793,898 B2 * | 9/2004 | Brown et al. ........... 422/186.21 |

\* cited by examiner

PLASMA REACTOR FOR THE PRODUCTION OF HYDROGEN-RICH GAS

RELATED APPLICATION DATA

This application claims the benefit of International Application No. PCT/US2004/19589 filed on Jun. 18, 2004, under 35 U.S.C. §365(c), which, in turn, claims the benefit of U.S. Provisional Application No. 60/480,132, filed on Jun. 20, 2003, under 35 U.S.C. §119(e).

BACKGROUND OF THE INVENTION

1. Field of the Invention

The present invention relates to a plasma reactor and process for the production of hydrogen-rich gas from light hydrocarbons.

2. Description of the Related Technology

Improving the efficiency of energy production remains an important technological goal, owing to the significant economic benefits that result in almost every sector of the economy. One potential method for improving the efficiency of energy production is to provide an energy efficient method of converting light hydrocarbons to hydrogen-rich gas, to thereby increase energy production from natural gas.

Plasma fuel converters such as plasmatrons are known to reform hydrocarbons to produce hydrogen-rich gas. DC arc plasmatrons, for example, are disclosed in U.S. Pat. Nos. 5,425,332 and 5,437,250. DC arc plasmatrons generally operate at low voltage and high current. As a result, these plasmatrons are particularly susceptible to electrode erosion and/or melting. DC arc plasmatrons also require relatively high power inputs of 1 kW or more and relatively high flow rates of coolant to keep the temperature in check.

Other conventional methods for the conversion of light hydrocarbons to hydrogen-rich gas are generally energy inefficient and, as a result, in many small-scale applications, such as the production of hydrogen for fuel cells, the cost of hydrogen gas made by these methods is not competitive. Thus, there is a need in the art for a more energy efficient process for the conversion of light hydrocarbons to hydrogen-rich gas.

U.S. Pat. Nos. 5,993,761 and 6,007,742 (Czernichowski et al.) describe processes for the conversion of light hydrocarbons to hydrogen-rich gas using gliding arc electric discharges in the presence of oxygen and, optionally, water. In the process, two electrodes having flat sheet geometry are arranged for arc ignition and subsequent gliding of the arc. The distance between the cathode and anode gradually increases to a point that no longer supports the gliding arc. As a result, the gliding arc disappears at one end of the electrodes, creating pulsed plasma wherein the properties of the plasma change with time. Due to the use of pulsed plasma, the process is relatively unstable over time. Reagents and oxygen are preheated using an external heat source. As a result of the preheating of the reagents and oxygen using an external heat source, the process suffers from poor energy efficiency. A premixed feed gas including hydrocarbons and oxygen is introduced to the reactor located at the central axis of the reactor.

U.S. Pat. No. 5,887,554 (Cohn et al.) also discloses a system for the production of hydrogen-rich gas from light hydrocarbons. The system includes a plasma fuel converter for receiving hydrocarbon fuel and reforming it into hydrogen-rich gas. The plasma fuel converter can be operated using either pulsed or non-pulsed plasma and can utilize arc or high frequency discharges for plasma generation. Products from the plasma fuel converter are employed to preheat air input to the fuel converter. In one embodiment shown in FIG. 6, residence time in the reactor is increased by providing a centralized anode and a plurality of radial cathodes to thereby cause the arc to glide towards the center of the reactor under the influence of gas flowing in the same direction as the gliding arc.

U.S. Pat. No. 6,322,757 (Cohn et al.) discloses a plasma fuel converter which employs a centralized electrode and a conductive reactor structure which acts as the second electrode for creation of a plasma discharge. Reagents are fed to the reactor just below the smallest gap between the electrodes and flow in the same direction as the gliding arc to thereby produce hydrogen-rich gas. In alternative embodiments, air and/or fuel are preheated by counter-flow heat exchange with the products of the reforming reaction and fed to the reactor either above or just below the smallest gap between the electrodes.

Although some improvements in the energy efficiency of plasma fuel converters have been achieved, there remains a need for higher energy efficiencies for use of non-equilibrium low temperature plasma.

SUMMARY OF THE INVENTION

Accordingly, it is an object of certain embodiments of the invention to provide a plasma fuel converter and a process for the conversion of light hydrocarbons to hydrogen-rich gas using a low temperature, non-equilibrium plasma.

It is another object of certain embodiments of the invention to provide a plasma fuel converter and a process for the conversion of light hydrocarbons to hydrogen-rich gas using a low temperature, non-equilibrium plasma that has a relatively high energy efficiency.

In order to achieve the above and other objects of the invention, a plasma reactor for conversion of light hydrocarbons to hydrogen-rich gas is disclosed. In a first aspect, the plasma reactor has a wall defining a reaction chamber. The plasma reactor also has an outlet. The plasma reactor has a reagent inlet fluidly connected to the reaction chamber for creating a vortex flow in the reaction chamber. The plasma reactor also has a first electrode and a second electrode connected to a power source for generating a sliding arc discharge in the reaction chamber.

In another aspect of the invention, a method for plasma conversion of light hydrocarbons to hydrogen-rich gas is provided. In the method, a plasma reactor is provided. The plasma reactor has a wall defining a reaction chamber, an outlet, and a reagent inlet fluidly connected to the reaction chamber for creating a vortex flow in the reaction chamber. The plasma reactor also has a first electrode and a second electrode connected to a power source for generating a sliding arc discharge in the reaction chamber. The method includes introducing a gas selected from the group consisting of one or more light hydrocarbons, oxygen, an oxygen containing gas, and mixtures thereof, into the reaction chamber in a manner that creates a vortex flow in the reaction chamber. The method also includes processing the light hydrocarbons using a plasma assisted flame; and recovering hydrogen-rich gas from the reactor.

These and various other advantages and features of novelty that characterize the invention are pointed out with particularity in the claims annexed hereto and forming a part hereof. However, for a better understanding of the invention, its advantages, and the objects obtained by its use, reference should be made to the drawings which form a further part hereof, and to the accompanying descriptive matter, in which there is illustrated and described a preferred embodiment of the invention.

DETAILED DESCRIPTION OF THE PREFERRED EMBODIMENTS

The present invention relates to a device and process for conversion of light hydrocarbons to hydrogen-rich gas using a low temperature, non-equilibrium plasma. The term "light hydrocarbons" as used herein refers to $C_1$ to $C_4$ hydrocarbons, which may be saturated or unsaturated, branched or unbranched, and substituted or unsubstituted with one or more oxygen, nitrogen, or sulfur atoms.

In general, dimensions, sizes, tolerances, parameters, shapes and other quantities and characteristics are not and need not be exact, but may be approximate and/or larger or smaller, as desired, reflecting tolerances, conversion factors, rounding off, measurement error and the like, and other factors known to those of skill in the art. In general, a dimension, size, parameter, shape or other quantity or characteristic is "about" or "approximate" as used herein, whether or not expressly stated to be such.

Gaseous hydrocarbons and oxygen (pure oxygen or oxygen in air, or oxygen in enriched air) are the reagents in the process of the present invention. The conversion process consists of two steps as illustrated below using methane as the light hydrocarbon reagent:

$$CH_4 + 2O_2 \rightarrow 2H_2O + CO_2 \quad (I)$$

$$2CH_4 + CO_2 + 2H_2O \rightarrow 6H_2 + 3CO \quad (II)$$

Step (I) is exothermic, whereas step (II) is endothermic and tends to be the rate-determining step.

Figure 1:
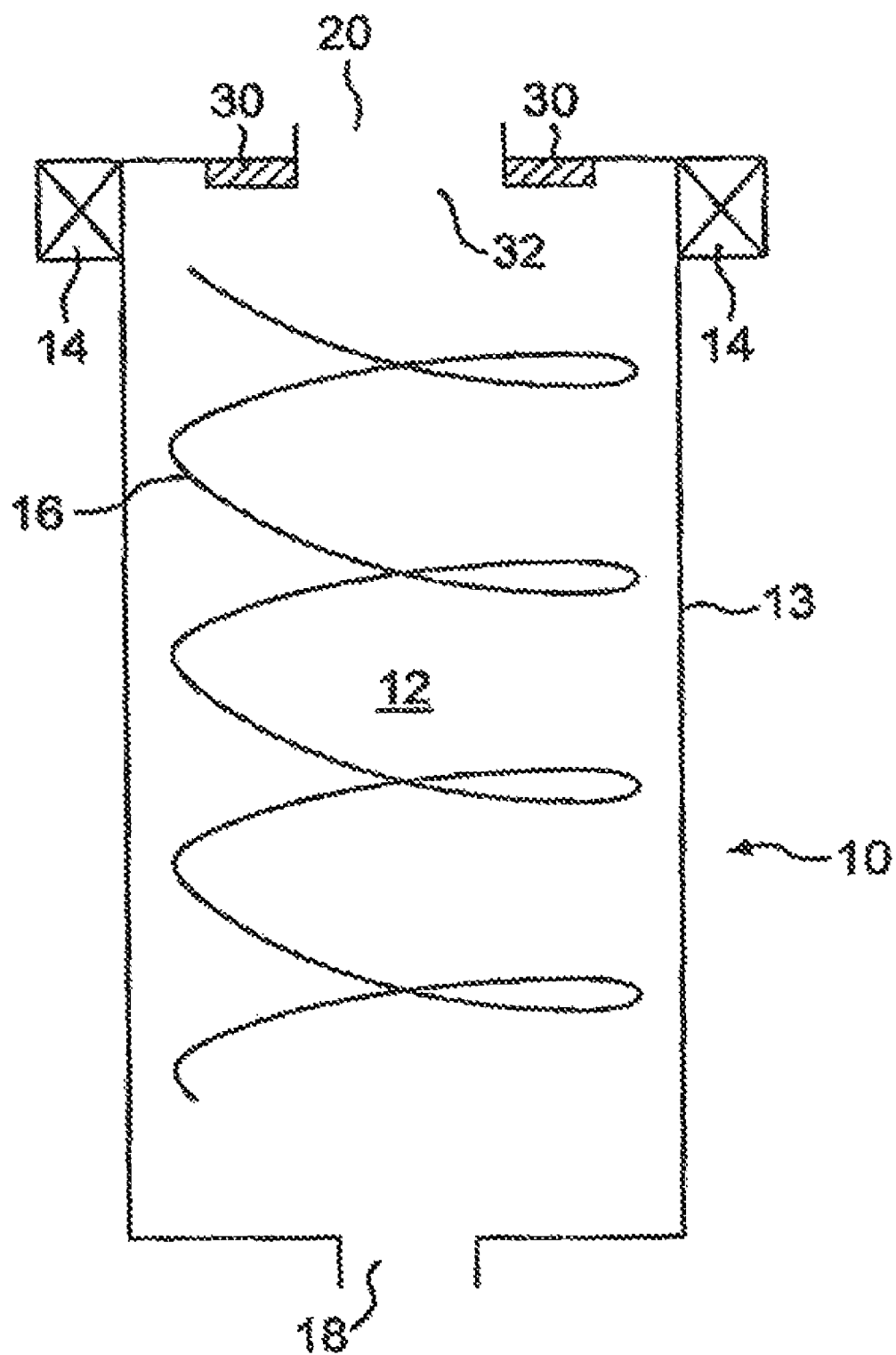
FIG. 1 is a schematic representation of a vortex reactor in accordance with the present invention showing the circumferential flow component of the first gas.

Referring now to the drawings, wherein like reference numerals designate corresponding structure throughout the views, and referring in particular to FIG. 1, a schematic view of a vortex reactor 10 of the present invention is depicted. Vortex reactor 10 includes a reaction chamber 12. At or near the top of vortex reactor 10, there are one or more nozzles 14 for feeding a first gas to vortex reactor 10. Nozzles 14 may be located about the circumference of vortex reactor 10 and are preferably spaced evenly about the circumference. Preferably, at least four nozzles 14 are employed. The first gas is introduced to reaction chamber 12 via nozzles 14 which are oriented tangential relative to wall 13 of reaction chamber 12. The tangential orientation of nozzles 14 imparts a circumferential velocity component 16 to the first gas as it is introduced to reaction chamber 12. The set of nozzles 14 for the first gas feeding will be referred to as the first swirl generator. Optionally, a second swirl generator comprising nozzles 15, shown in FIG. 2b can be installed along the length of the chamber. Multiple swirl generators, i.e. more than two, can be installed for introduction of multiple gases as desired. Preferably all swirl generators rotate gas in the chamber in the same direction. Products leave reaction chamber 12 via outlet 20 located at or near the top of reaction chamber 12.

One embodiment of the present invention employs a flange 30 with a circular opening 32 located substantially at the center of flange 30 to form a reverse vortex flow. Flange 30 is located proximate to the first swirl generator with nozzles 14. The opening 32 in the flange 30 is preferably circular, but may be other shapes such as pentagonal or octagonal. The size of circular opening 32 is important to determining the flow pattern in reaction chamber 12. The diameter of opening 32 in flange 30 should be from about 70% up to 95% of the diameter of reaction chamber 12 to form the reverse vortex flow similar to that shown in the FIG. 2 without a considerable recirculation zone. To form the reverse vortex flow with a considerable recirculation zone 110 (FIG. 2b), the diameter of opening 32 in flange 30 should be from about 10% up to 75% of the diameter of reaction chamber 12.

Figure 7:
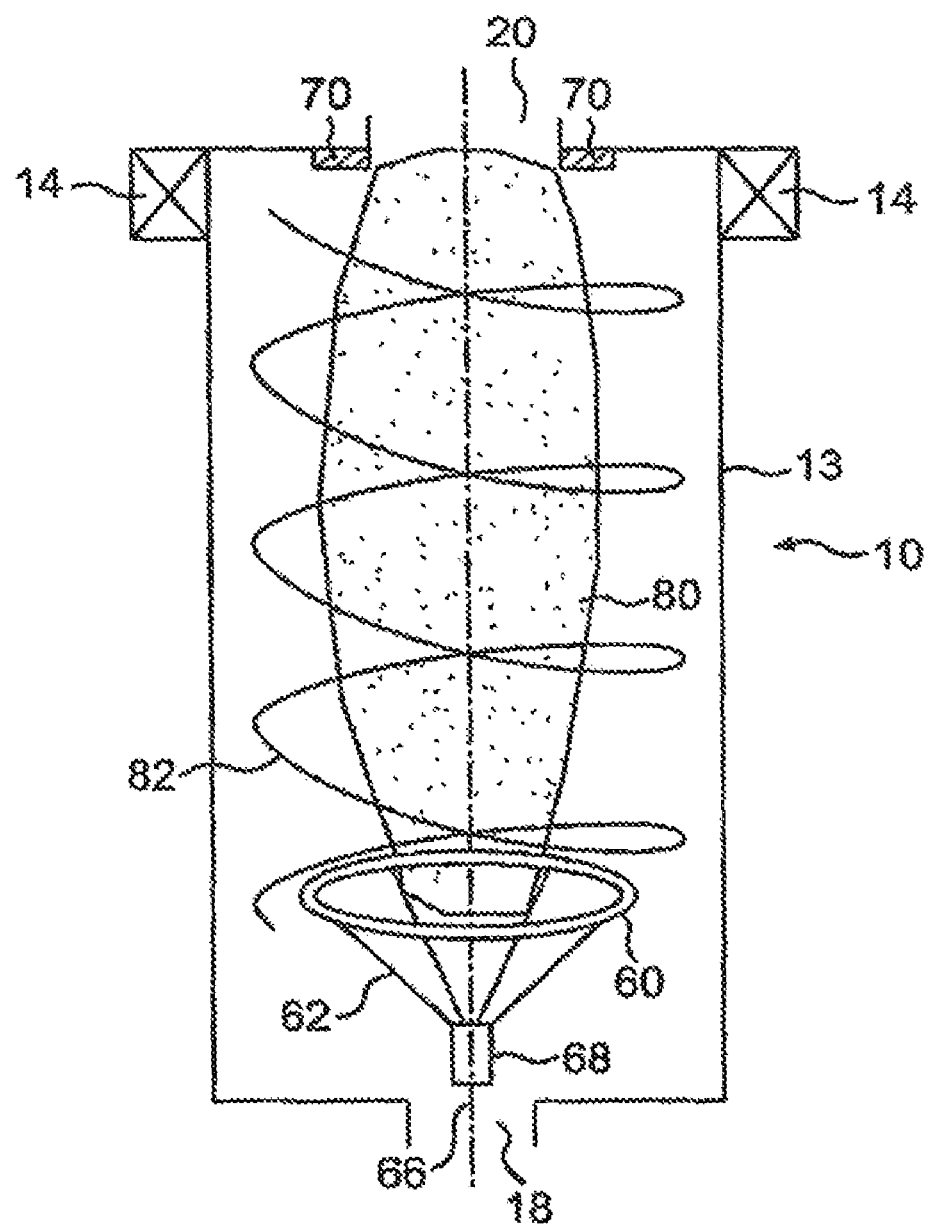
FIG. 7 is a schematic representation of a vortex reactor in accordance with the present invention showing the movable circular ring electrode in the reactor operating position.

The reverse vortex flow in reaction chamber 12 causes the reagents to swirl around a region of plasma and flame 80, shown, for example, in FIG. 7, in reaction chamber 12. This provides heating of the reagents as they move downwardly around central core region 24. Also, the reverse vortex flow increases the residence time of reactants inside reaction chamber 12. Increased residence time helps to complete the second step (II) of the conversion reaction. Large recirculation zone 110 also promotes completion of the conversion process especially by decreasing ignition time (initiation of the first step (I) of the conversion reaction).

Reverse vortex flow in this invention means that the vortex flow has axial motion initially from the swirl generator to the "closed" end of reaction chamber 12 (along wall 13 of the chamber), and then the flow turns back and moves along the axis to the "open" end of the chamber, where a swirl generator may be placed. This flow is similar to the flow inside a dust separation cyclone, or inside a natural tornado. This flow has very interesting and useful properties. For example, gas dynamic insulation of the central (axial) zone: walls of the chamber do not "feel" what is going on in the center. It can be cold or extremely hot (flame or plasma) in the center of reaction chamber 12. Primarily the temperature of incoming gas defines the temperature of wall 13. For the process pf hydrocarbon conversion it means that the zone of combustion is separated from wall 13.

Without the reverse vortex flow, the reagents would enter reaction chamber 12 through inlet 18 and pass between the electrodes forming the plasma and leave reaction chamber 12 at a relatively high velocity, and, at least in a small reactor, incomplete conversion of the reagents of the conversion reaction would likely occur. The present invention provides an increased residence time in reaction chamber 12, by causing the reactants to travel a greater distance in the reactor by imparting a circumferential velocity component to the reagents. Residence times can be increased by an order of magnitude using a preferred form of the reverse vortex flow. This helps to ensure complete conversion of the reactants to products of the conversion reaction.

In the embodiment of FIG. 1, the reagents are premixed and introduced to reaction chamber 12 via nozzles 14. This creates a full volume of flame in reaction chamber 12 causing reactor wall 13 to become very hot, indicating a significant energy loss to the environment from reactor 10. As a result of this condition, care must be taken to provide safe conditions for ignition of the flame and to prevent combustion of the reagents prior to their entry into reaction chamber 12. These factors indicate that the embodiment of FIG. 1, wherein the reagents are premixed and fed to reaction chamber 12 via nozzles 14, is a less preferred embodiment of the invention. Typical inlet velocities for feeding gas into reaction chamber 12 via nozzles 14 is from about 10 m/s to about 50 m/s.

Figure 2:
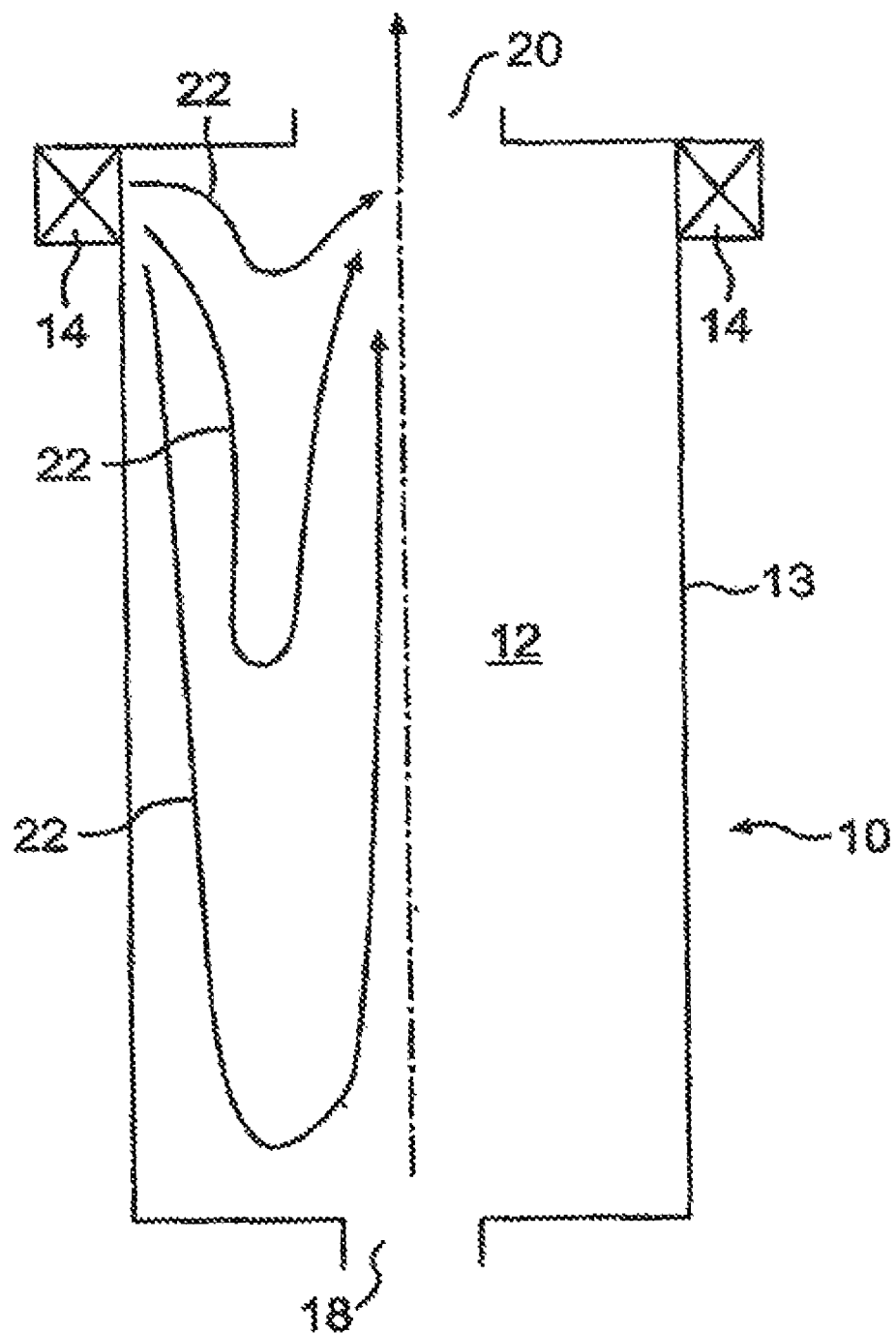
FIG. 2 is a schematic representation of a vortex reactor in accordance with the present invention showing the axial flow component of the gases in the reaction chamber.

In order to reduce heat loss to the environment and minimize the risk of unwanted combustion outside the reactor, two separate gases or gaseous mixtures that both are non-flammable and that form together a flammable gas mixture, can be fed to reaction chamber 12 via different inlets as depicted in FIG. 2. In the present invention, non-flammable means non-combustible under the conditions existing at the specified location (in this embodiment, outside the reactor). In this embodiment, a second gas is fed from the bottom of reaction chamber 12 via gas inlet 18 co-directionally with an upward axial flow component of the first gas in reaction chamber 12 accelerating this axial flow component. In this manner, the present invention ensures a sufficiently high axial velocity in reaction chamber 12 to move a gliding arc axially upwardly for plasma creation. The reverse vortex flow also helps to mix the first and second gases in the reaction chamber 12.

Figure 2B:
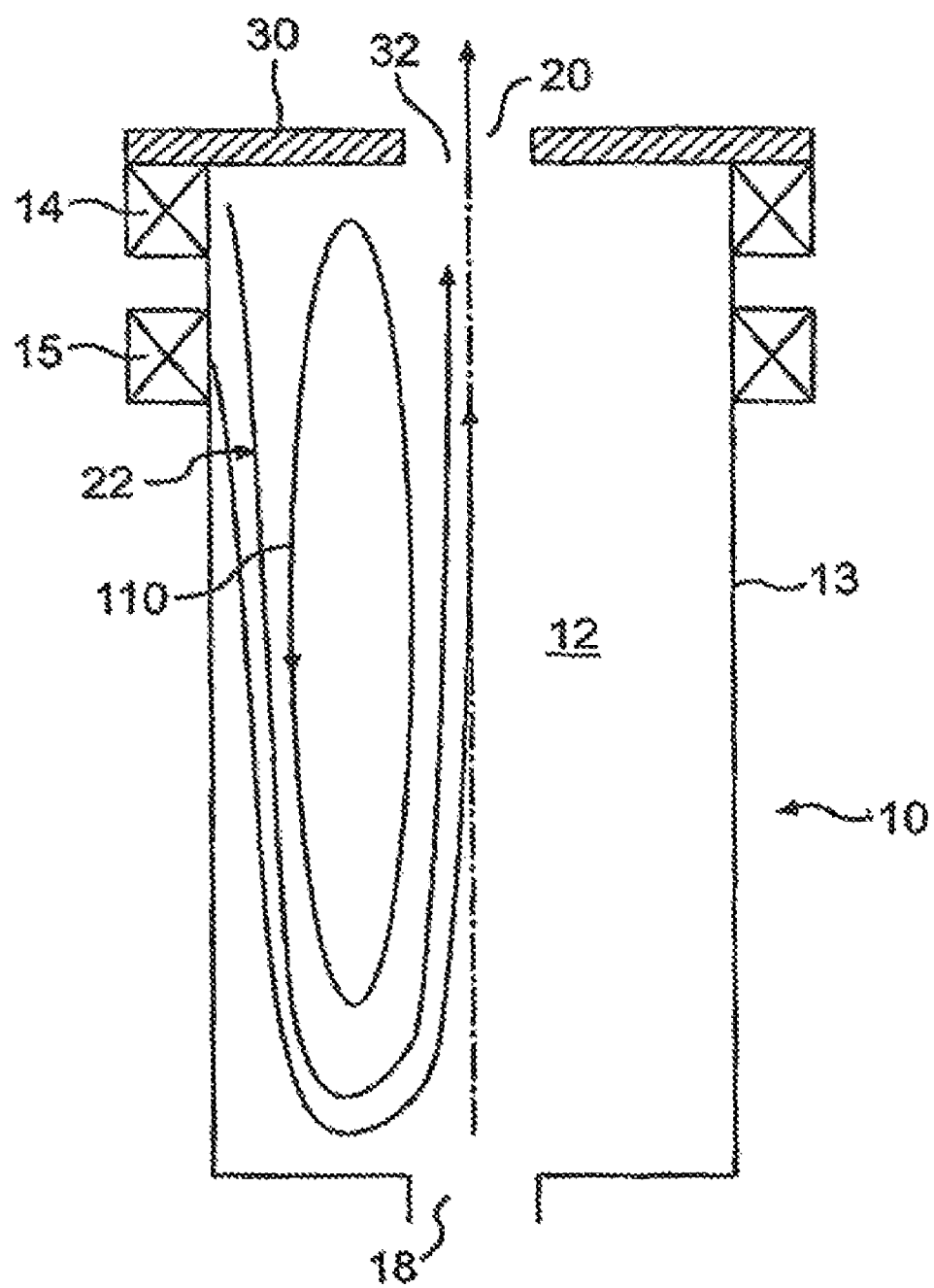
FIG. 2b is a schematic representation of a vortex reactor showing a second swirl generator.

In order to minimize the risk of unwanted combustion outside the reactor, two separate gases or gaseous mixtures that both are non-flammable and that form together flammable gas mixture, can also be fed to the reaction chamber via different swirl generators (made of nozzles 14 and nozzles 15 as depicted in FIG. 2b).

A preferred ratio of the tangential flow velocity to the axial flow velocity is about 4.0. This ratio of flow velocities causes the reverse vortex flow to follow approximately a 15 degree slope in reaction chamber 12. Preferably, in this embodiment, the hydrocarbon-rich feed gas is introduced to reaction chamber 12 via nozzles 14 and an oxygen-rich gas is introduced to reaction chamber 12 through inlet 18. In this manner, the flame in reaction chamber 12 can be maintained at a distance from wall 13 of reactor 10, thereby keeping the wall of reactor 10 relatively cool. This is achieved as a result of the downward flow of the hydrocarbon-rich gas from nozzles 14 along wall 13 of reaction chamber 12, which provides insulation between the plasma and flame and reactor wall 13. In this manner, heat loss to the environment can be reduced thereby further improving the efficiency of reactor 10. However, it is also possible to achieve acceptable results by feeding the hydrocarbon-rich feed gas to reaction chamber 12 via inlet 18 and the oxygen-rich gas via nozzles 14.

Figure 3:
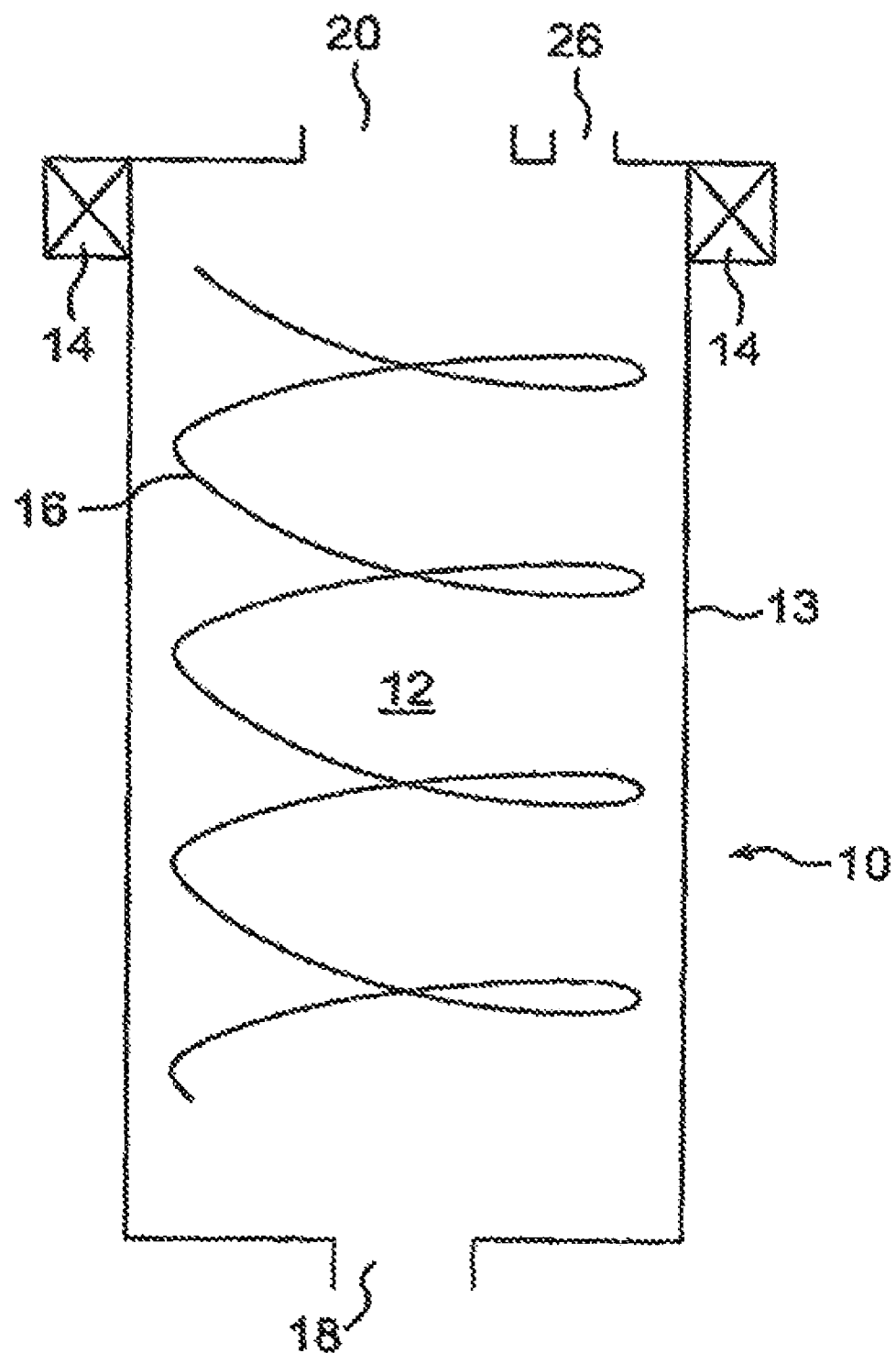
FIG. 3 is a schematic representation of a vortex reactor in accordance with the present invention and having a third gas inlet.

Referring to FIG. 3, there is shown another embodiment of reactor 10 of the present invention which further includes a third inlet 26 at the top of reaction chamber 12 for introduction of a third gas to reaction chamber 12. The third gas may be employed, as necessary, to assist the flame in t reaction chamber 12. Preferably, the third gas is oxygen-rich gas.

Figure 4:
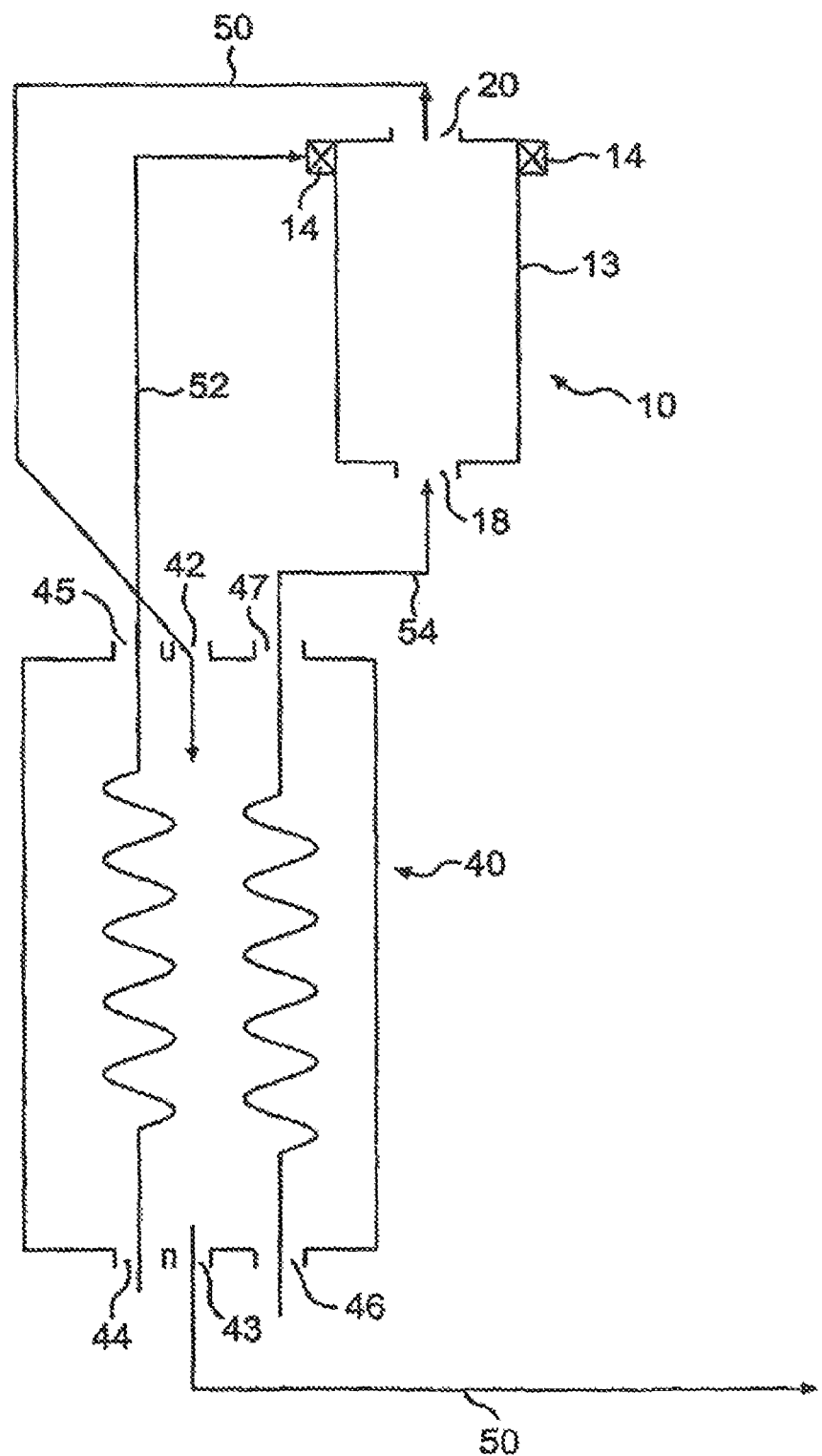
FIG. 4 is a schematic representation of a vortex reactor in accordance with the present invention provided with a counter-current heat exchanger.

In another embodiment of the invention shown in FIG. 4, a heat exchanger 40 is employed to preheat the at least one feed gas for reactor 10. Preferably, when employing two or more inlets to feed gas to reactor 10, at least two of the feed gases are preheated in heat exchanger 40. More preferably, both the hydrocarbon-rich gas fed via nozzles 14 and the oxygen-rich gas fed via inlet 18 are preheated in heat exchanger 40. Also, it is preferred to preheat the feed gases by counter-current heat exchange with the product stream from reactor 10 as shown in FIG. 4. This reduces the amount of energy input to the system for preheating the feed gases, and cools the product stream, which is also desirable in the process of the invention.

FIG. 4 shows reactor 10, provided with a wall 13, nozzles 14, inlet 18 and a product outlet 20. Product stream 50 is fed from product outlet 20 to inlet 42 at a first end of heat exchanger 40, through heat exchanger 40 to product outlet 43 of heat exchanger 40. Product stream 50 leaves heat exchanger 40 as a hydrogen-rich cooled gas. At least one feed gas is fed to inlets 44, 46 located at a second end of the heat exchanger 40 for counter-current heat exchange with product stream 50. In the embodiment of FIG. 4, first feed gas stream 52 is fed to inlet 44 of heat exchanger 40 and leaves heat exchanger 40 via first gas outlet 45, whereupon first feed gas stream 52 is fed to nozzles 14 of reactor 10. Second feed gas stream 54 is fed to inlet 46 of heat exchanger 40, and leaves heat exchanger 40 via second gas outlet 47, whereupon second feed gas stream 54 is fed to inlet 18 of reactor 10.

Figure 5:
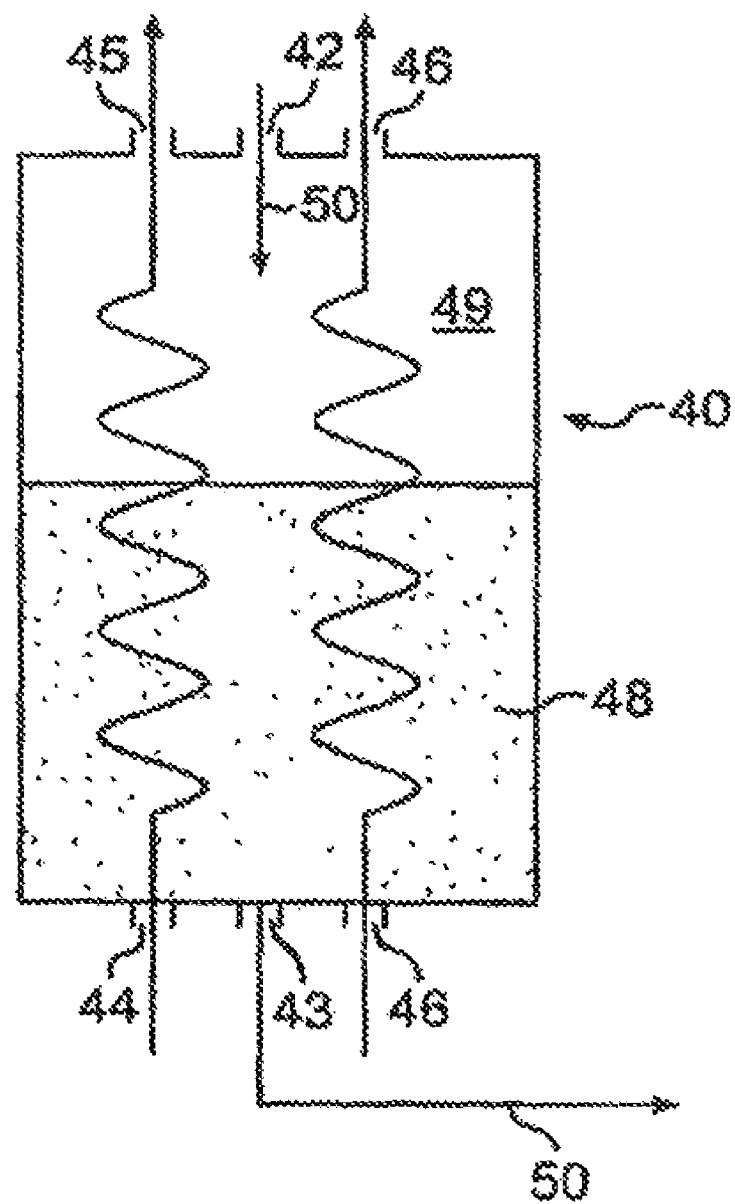
FIG. 5 is a schematic representation of an alternative embodiment of a heat exchanger which may be used in accordance with the present invention.

In order to increase the heat exchange capacity of heat exchanger 40, heat exchanger 40 may be filled with a heat conducting material, such as nickel pellets 48. Other suitable heat conducting materials may be employed, though it is preferable to use nickel-based metals as the heat conducting material. In a more preferred embodiment, heat exchanger 40 is partially filled with a heat conducting material, such as nickel pellets 48, as shown in FIG. 5. The remaining, unfilled portion 49 of heat exchanger 40 may be left as empty space. In a preferred embodiment, about half of the volume of heat exchanger 40 is filled with heat-conducting material. This serves to increase the residence time of intermediate products of product stream 50 in heat exchanger 40 to thereby improve conversion of the intermediate products to the final products via step (II) of the reaction given above. In this manner, significant conversion of intermediate products to final products can be realized in heat exchanger 40.

Figure 4B:
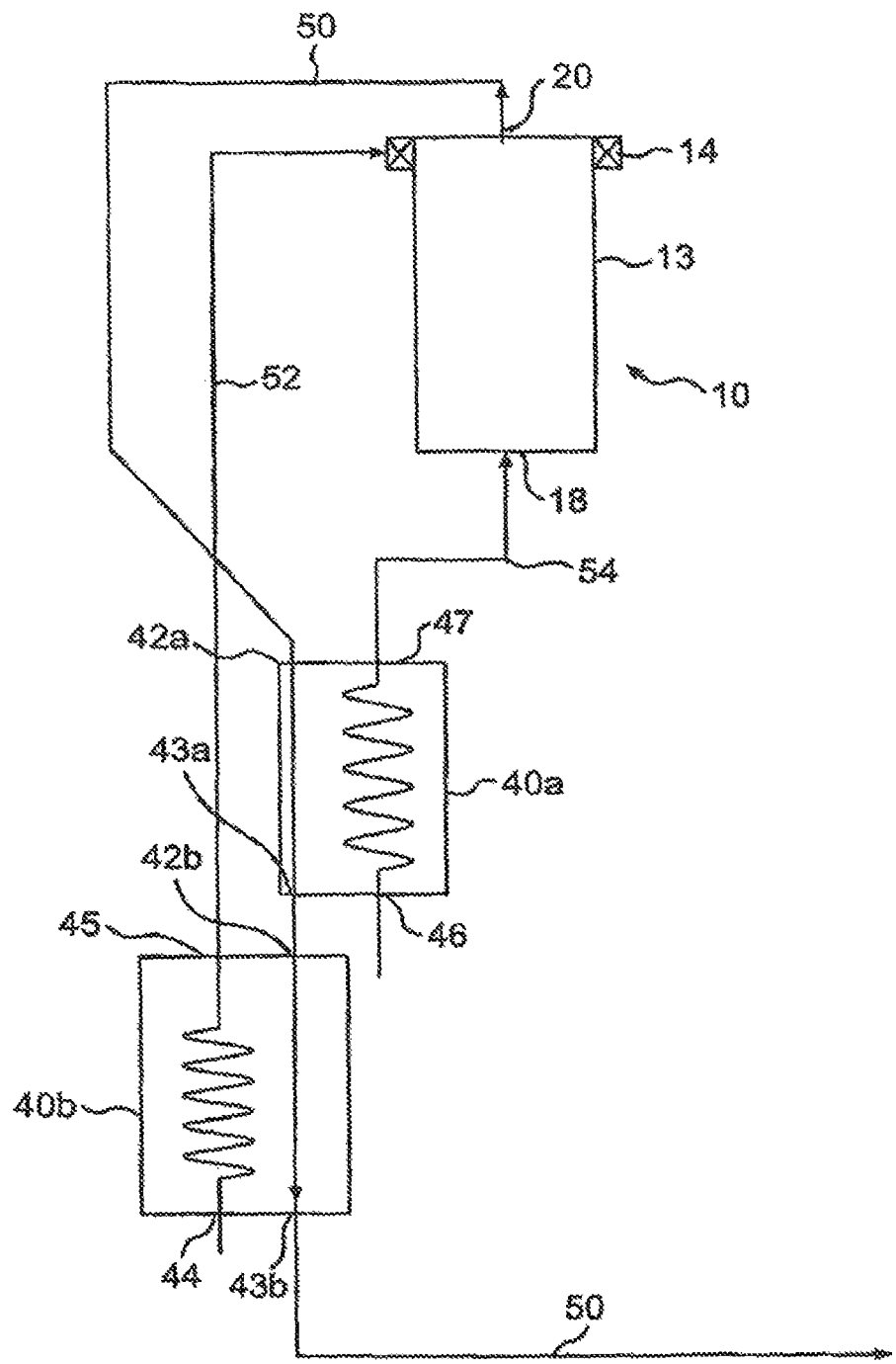
FIG. 4b is a schematic representation of a vortex reactor with two heat exchangers employed.

In another embodiment of the invention shown in FIG. 4b, two or more heat exchangers, 40a and 40b, are employed to preheat the feed gases separately to desirable temperatures. Preferably, when employing one or more inlets to feed pure hydrocarbon gas to reactor 10, this pure hydrocarbon gas should not be preheated to the temperature higher than the decomposition temperature (gaseous hydrocarbons decompose under the high temperature conditions to soot and hydrogen, for example for methane this decomposition start temperature is about 450° C.). It is preferred to preheat the feed gases by counter-current heat exchange with the product stream from reactor 10, and also to preheat oxygen-rich gas to higher temperature as shown in FIG. 4b.

In FIG. 4b, reactor 10 is provided with a wall 13, nozzles 14, inlet 18 and a product outlet 20. Product stream 50 is fed from product outlet 20 to inlet 42a at a first end of heat exchanger 40a, through heat exchanger 40a to product outlet 43a of heat exchanger 40a. Product stream 50 then enters inlet 42b at a first end of heat exchanger 40b, passes through heat exchanger 40b to product outlet 43b of heat exchanger 40b. Product stream 50 leaves heat exchanger 40b as a hydrogen-rich, cooled gas. At least one feed gas is fed to inlets 44, 46 located at the second ends of heat exchangers 40b and 40a, respectively, for counter-current heat exchange with product stream 50. In the embodiment of FIG. 4b, first feed gas stream 52 is fed to inlet 44 of heat exchanger 40b and leaves heat exchanger 40b via first gas outlet 45, whereupon first feed gas stream 52 is fed to nozzles 14 of reactor 10. Second feed gas stream 54 is fed to inlet 46 of heat exchanger 40a, and leaves heat exchanger 40a via second gas outlet 47, whereupon second feed gas stream 54 is fed to inlet 18 of reactor 10.

If it is necessary to preheat the hydrocarbon-rich feed gas to the temperature higher than decomposition temperature, it is necessary to dilute the hydrocarbon gas with oxygen-rich gas, but this dilution should not result in formation of flammable mixture in feed gas stream.

The reactor of the present invention employs a plasma-assisted flame (PAF) in reaction chamber 12. The PAF is produced by preheating reaction chamber 12 and the heat exchanger(s) with an inert gas such as nitrogen, or with a lean (leaner than the mixture of reagents for conversion) combustion mixture, and replacing the preheating gas with the feed gases which provide the reagents for the reactions (I) and (II). As the reagents mix in reaction chamber 12, a flammable state is produced thereby resulting in the appearance of a flame in reaction chamber 12. Finally, the oxygen concentration in reaction chamber 12 is reduced to a low level, which is at least sufficient to maintain a stable flame and to avoid soot formation. The oxygen concentration in reaction chamber 12 can alternatively be maintained at a level which provides a stoichiometric amount of oxygen for the reactions (I) and (II), as long as the flame is stable at this concentration. Thus, in a preferred embodiment, the number of oxygen atoms [O] in the sum of all feed gases that come to reaction chamber 12 is at least as large as the number of carbon atoms [C] in the same sum of all feed gases coming to reaction chamber 12, as long as the flame is stable at this oxygen-rich gas feed. If the flame is stable using a stoichiometric concentration of oxygen ([O]/[C]=1), part of oxygen atoms can be fed to the reactor in the form of water vapor to produce more hydrogen via the reaction:

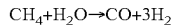

$$CH_4+H_2O \rightarrow CO+3H_2$$

Using sliding arc plasma, as in the present invention, the soot-less flame can be maintained even with combinations of reactants which would normally be outside the limit of flammability or which can burn only with soot production, hence the term "plasma assisted flame" (PAF) appears. The PAF provides fast conversion of reagents to intermediate products, while keeping the energy input to the reactor at an efficient level (preferably less than 2% of the total chemical energy of the hydrocarbon gas), since the PAF consumes less electrical energy than sliding arc plasma alone. The PAF also permits the use of lower concentrations of oxygen in reaction chamber 12 to maintain the soot-less flame. This is desirable since lower oxygen concentrations tend to result in greater hydrogen production by minimizing the amount of water generated in reaction chamber 12 by reaction of oxygen with light hydrocarbons.

In one embodiment of the invention, the present invention utilizes a constant distance between electrodes to maintain a stable sliding arc in order to avoid the production of pulsed plasma, wherein the properties of the plasma constantly change with time. By maintaining the sliding arc with a constant distance between the electrodes, stable plasma is obtained and the properties of the plasma do not change significantly with time.

Figure 6:
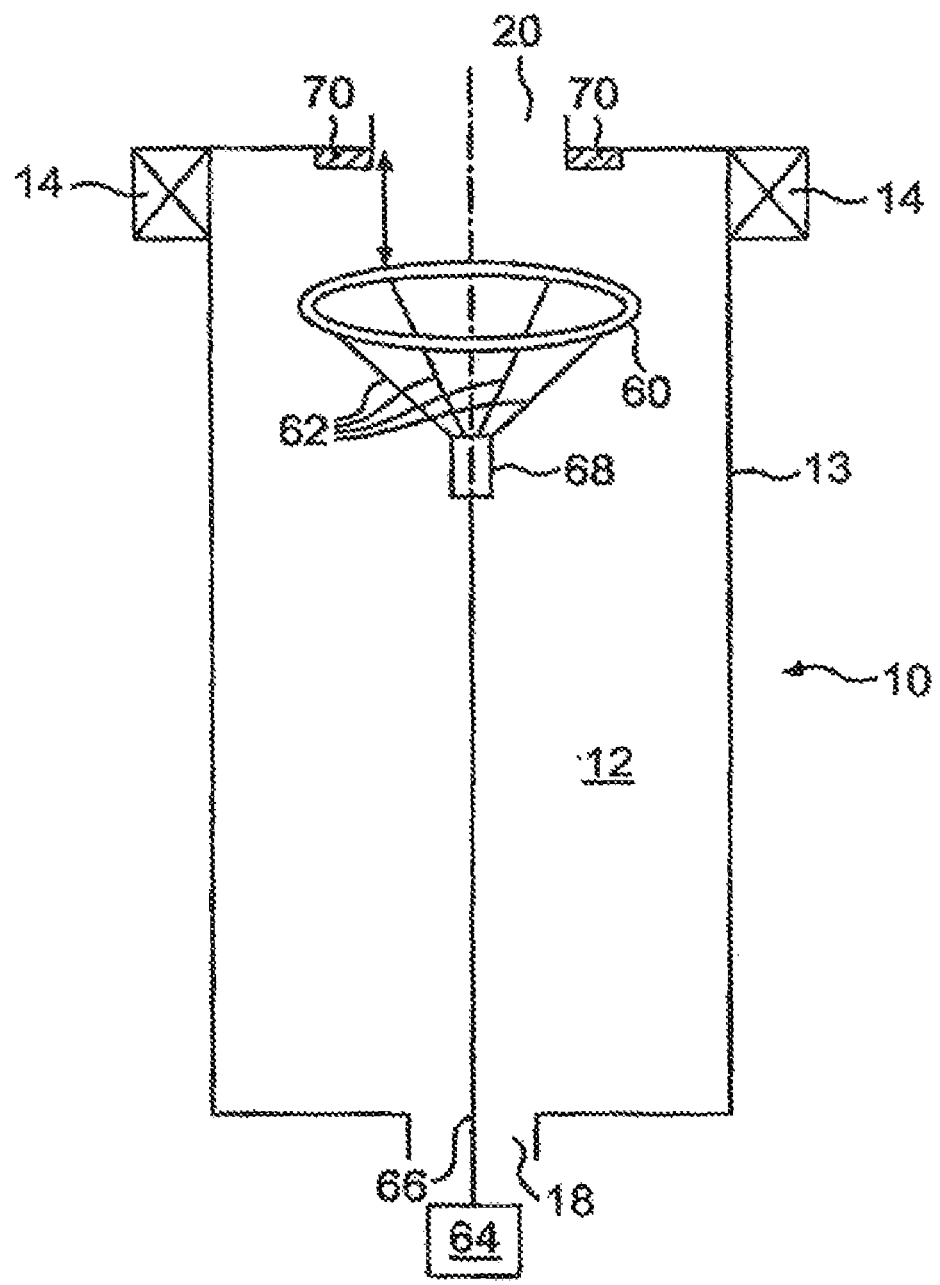
FIG. 6 is a schematic representation of a vortex reactor in accordance with the present invention showing the movable circular ring electrode in the ignition position.

The stable sliding arc can be obtained, for example, using electrodes as shown in FIG. 6. In FIG. 6, a first electrode is provided in reaction chamber 12 in the form of a circular ring electrode 60, supported by supporting wires 62 and connected to a power supply 64 via an electrical connection 66. A second electrode 70 is preferably located in an upper portion of reaction chamber 12.

Circular ring electrode 60 is mounted, via supporting wires 62 on a movable 10 mount 68 for substantially vertical movement in reaction chamber 12. Movable mount 68 is actuatable from outside reactor 10 to permit adjustment of the distance between circular ring electrode 60 and second electrode 70. This arrangement permits circular ring electrode 60 to be positioned a first, minimum distance 69 from second electrode 70 for ignition of the sliding arc. Once the sliding arc is ignited, circular ring electrode 60 is moved vertically downwardly using movable mount 68 to position circular ring electrode 60 at a second, greater distance from second electrode 70, as shown in FIG. 7. In this manner, a short distance between circular ring electrode 60 and second electrode 70 can be provided for ignition, and a longer distance between circular ring electrode 60 and second electrode 70 can be provided for operation of 20 reactor 10. The ability to adjust the distance between the electrodes also allows the optimization of the sliding arc plasma generation in the reaction chamber 12 by selection of the optimal distance between the electrodes for reactor operation.

Power consumption per unit length of the sliding arc for a fixed current is constant, and electrode spot energy is constant. Thus, by increasing the distance between circular ring electrode 60 and second electrode 70, the power consumption in reaction chamber 12 can be substantially increased without increasing the current strength provided to the reactor. As a result, the sliding arc can be operated without overheating, melting, evaporation and droplet erosion of the electrode surface at the arc point. This provides a significantly improved life expectancy for the electrodes.

Circular ring electrode 60, which forms the first electrode, can be interchanged with electrodes having other geometries. A circular geometry, for example, is desirable for a cylindrical reaction chamber 12, such as that illustrated in the drawings since this geometry will maintain the sliding arc at a relatively constant distance from wall 13 of reactor 10. Thus, for a cylindrical reaction chamber 12, circular ring electrode 60 can be interchanged with, for example a flat circular disc, not shown. Second electrode 70 can also be in the form of a circular ring electrode or flat circular disc. In a more preferred embodiment, second electrode 70 also acts as a flow restrictor and thus may take the place of flange 30, discussed above.

Figure 7B:
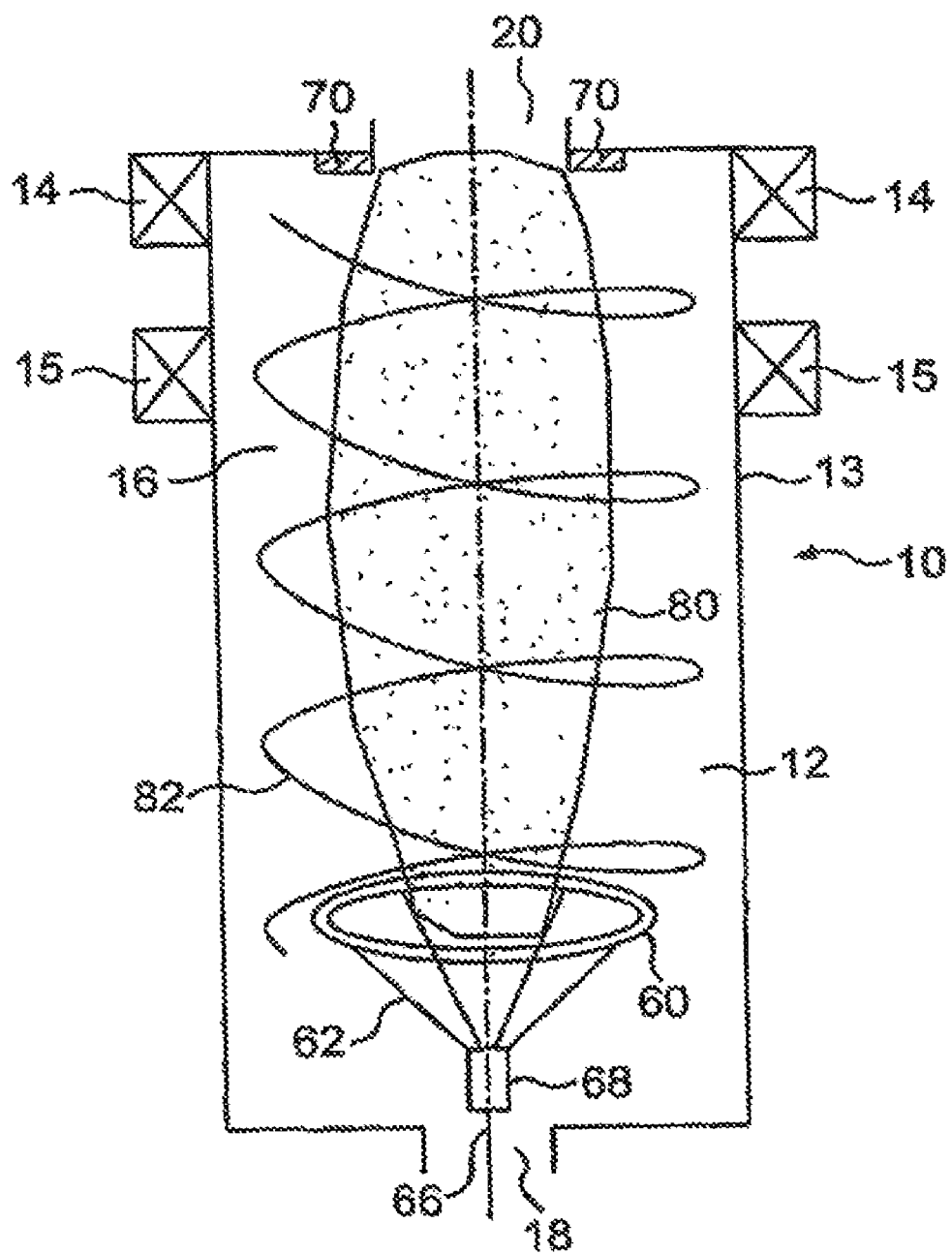
FIG. 7b is schematic representation of a vortex reactor showing a circular ring electrode supported by supporting wires.

Referring to FIG. 7, there is shown reactor 10 of FIG. 6 with circular ring electrode 60 in position to maintain a stable sliding arc for plasma generation. As shown in FIG. 7, the combination of the gas flows, electrode geometry and reagent mixture provide a PAF 80. Reagents flow around PAF 80 in a reverse vortex flow pattern 82, as shown. The stable sliding arc can be obtained, for example, using electrodes as shown in FIG. 7b. In FIG. 7b, a first electrode is provided in reaction chamber 12 in the form of a circular ring electrode 60, connected to a power supply 64. Second electrode 70 may be in the form of a circular ring electrode or flat circular disc. In a more preferred embodiment, second electrode 70 also acts as a flow restrictor and thus may take the place of flange 30. Also shown in FIG. 7b are swirl generators comprised of nozzles 15 and 14.

The distance between the circular ring electrode and grounded cylindrical wall of the reactor is small enough to ensure electrical breakdown in cold gas. Once the breakdown takes place, the sliding arc is elongated and rotated by the gas flow and reaches the constant length, which is the largest possible length.

Figure 8:
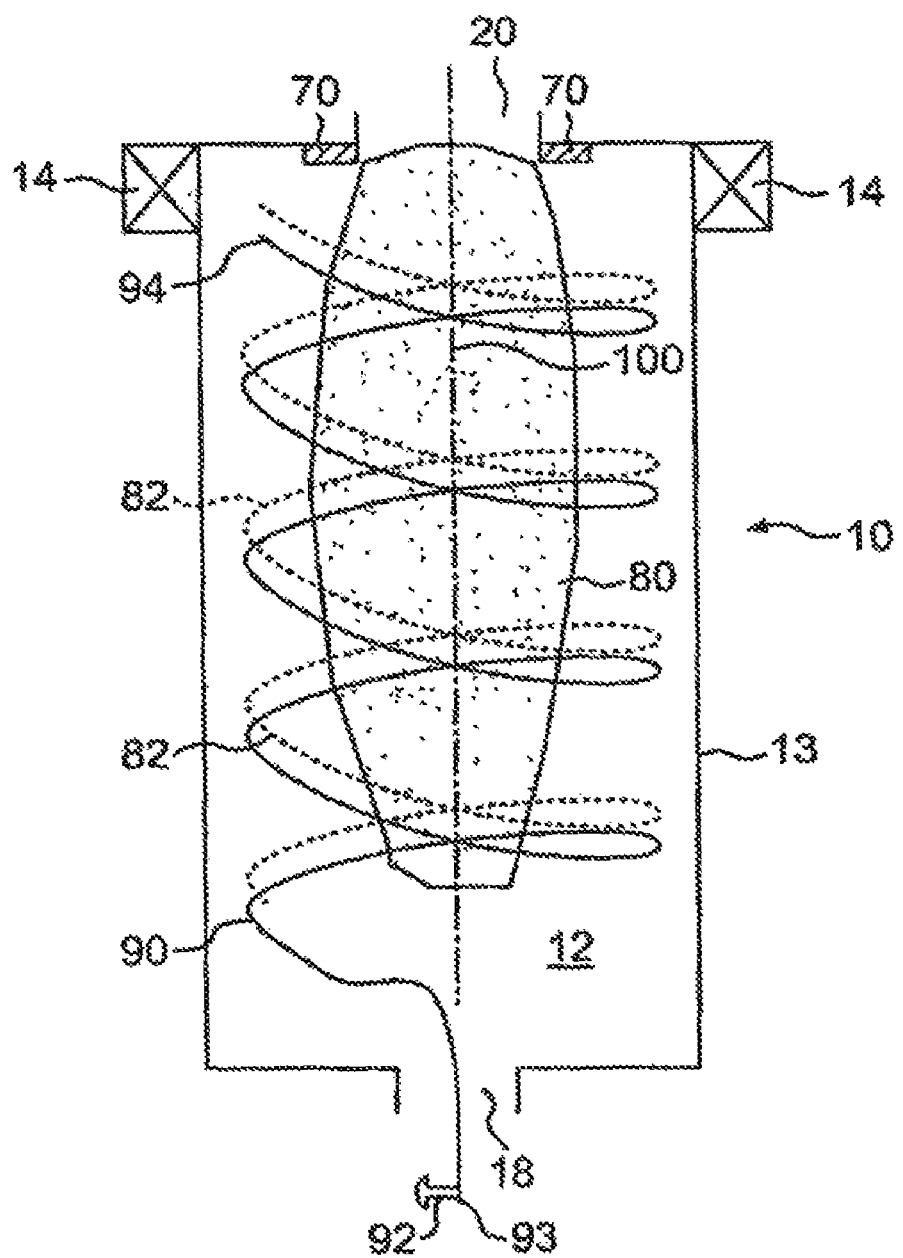
FIG. 8 is a schematic representation of a vortex reactor in accordance with the present invention provided with a spiral electrode.

In another embodiment shown in FIG. 8, the present invention employs a spiral electrode 90 as the cathode for providing the sliding arc. The anode may again be a flat disc 70 or circular ring as in the previous embodiments. Spiral electrode 90 may be anchored to the reactor 10 at one end thereof by any suitable attachment mechanism 92, such as a screw. Preferably spiral electrode 90 is of sufficient structural rigidity to support itself within reaction chamber 12, as shown. Spiral electrode 90 produces an arc, which slides from free end 94 of spiral electrode 92 toward anchored end 93 of spiral electrode 90.

The movement of the sliding arc is the result of reverse vortex flow 82 in reaction chamber 12. Since the sliding arc moves around, the arc spot on the surface of spiral electrode 90 continuously moves to a new location, thus protecting the electrode material from excessive wear in a single location. This helps provide a longer life for spiral electrode 90, and to prevent overheating, melting, evaporation and/or droplet erosion of the electrode surface at the arc point. Since the length of the sliding arc elongates by the reverse vortex flow, the arc reaches the maximal possible length, extinguishes and starts again once reactor 10 is running. Moreover, reverse vortex flow 82 of reagents in reaction chamber 12 helps provide easy breakdown conditions for the sliding arc in reactor 10.

The shape of spiral electrode 90 can be optimized based on the flow conditions within reaction chamber 12, and the type of power supply employed. For example, experimental flow visualization, numerical modeling and/or computerized flow simulation can be employed to help design the optimal shape for spiral electrode 90. For the preferred shape for spiral electrode 90 the diameter of each successive spiral decreases relative to the previous spiral, as the distance from anode 70 increases. Also, it may be preferable for the bottom of the spiral to form a circular ring to provide a similar geometry to that shown below in FIG. 9.

When a high potential, e.g. 3 kV/mm is applied across the electrodes, electrical breakdown ignites the gliding arc. The strong reverse vortex flow 82 in reaction chamber 12 forces the gliding arc to move around the longitudinal axis 100 of the reactor 10. The arc thus elongates itself along spiral electrode 90 until it eventually reaches the end of spiral electrode 90 furthest away from anode 70. Since the gliding arc is maintained in a central zone of t reaction chamber 12 by spiral electrode 90 as shown in FIG. 8, it is subjected to significantly less flow disturbances than it would be subjected to if the gliding arc extended closer to wall 13 of reactor 10. Also, the area of the gliding arc is subjected to intensive convective cooling as a result of reverse vortex flow 82 and the gliding arc is thermally insulated from wall 13 of reactor 10 by this same reverse vortex flow 82. These factors allow the provision of high plasma density, high power and high operating pressures, high electron temperatures, and relatively low gas temperatures. This combination of properties allows the selective stimulation of certain chemical processes within reactor 10, if desired.

Figure 9:
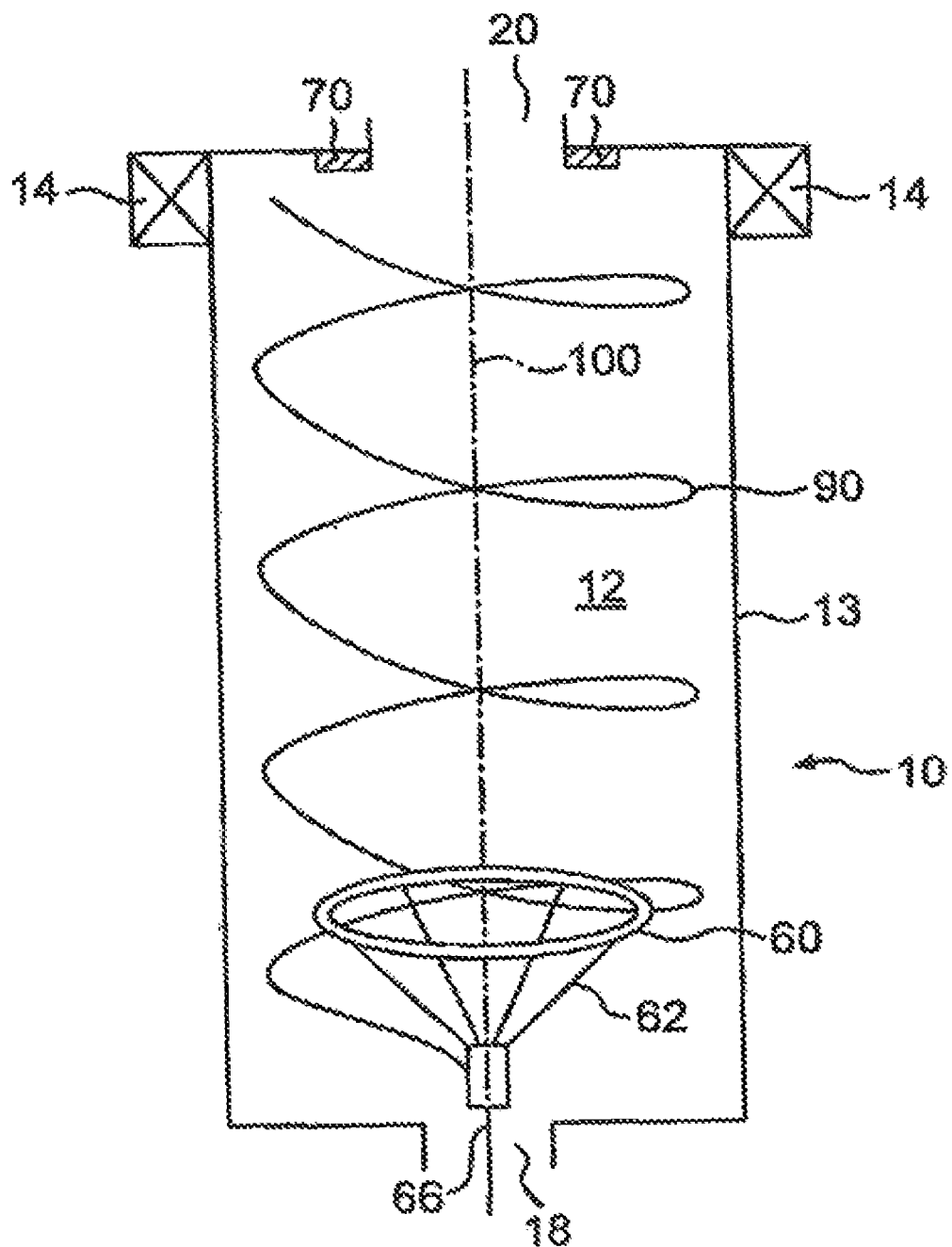
FIG. 9 is a schematic representation of a vortex reactor in accordance with the present invention provided with both a spiral electrode and a circular ring electrode.

In another embodiment of the present invention, shown in FIG. 9, a combination of a spiral electrode 90 and a circular ring electrode 60 is employed. This embodiment combines the advantage of having the arc between circular ring electrode 60 and anode 70 during normal operation of reactor 10 with the ability to reignite the sliding arc without moving circular ring electrode 60, if, for any reason, the arc should extinguish itself. Thus, in operation, the sliding arc is ignited at free end 94 of spiral electrode 90 and moves down spiral electrode 90 as described above. Once the sliding arc reaches circular ring electrode 60, it is maintained between circular ring electrode 90 and anode 70. Should the arc be extinguished, it will immediately reignite at free end 94 of spiral electrode 90 and the process will repeat itself. This arrangement adds additional stability to the plasma generation by minimizing the time that the arc is extinguished.

The arrangement shown in FIG. 9 is for the case of DC or two-phase AC power. For three-phase AC power, multiple arrangements of electrodes as shown in FIG. 9, can be employed.

Figure 10:
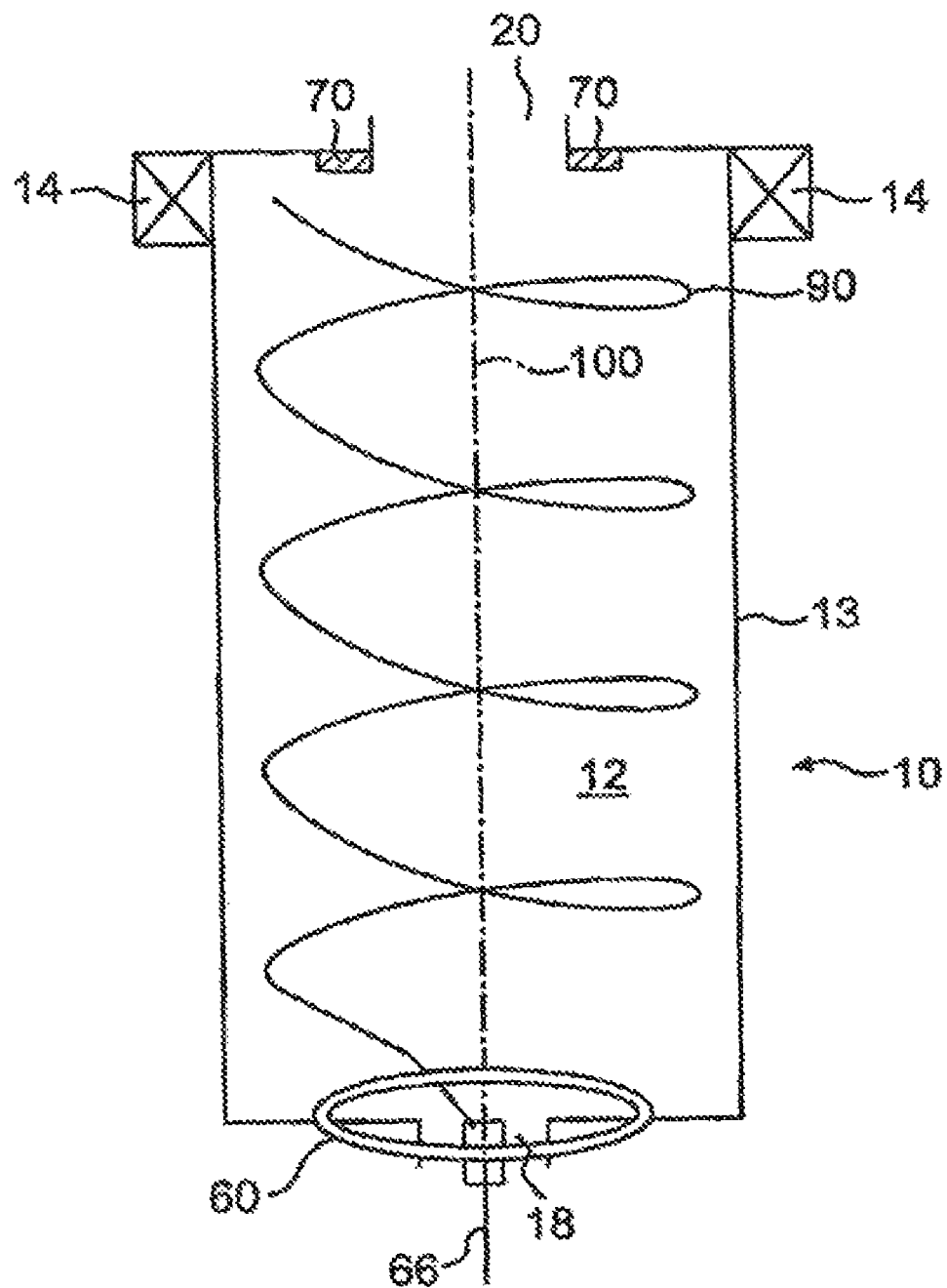
FIG. 10 is a schematic representation of a vortex reactor in accordance with the present invention provided with a circular ring electrode which forms part of the bottom of the reactor.

In yet another embodiment, shown in FIG. 10, a circular ring electrode 60 forms part of the bottom end of reactor 10.

In yet another embodiment (not shown), spiral electrode 90 forms part of cylindrical wall 13 of reactor 10.

It is to be understood that various features of the different embodiments shown in the drawings may be combined with one another in a vortex reactor in accordance with the present invention. For example, the various embodiments of heat exchanger 40 can be employed in any of the embodiments of the vortex reactor shown in the figures.

In a second aspect, the present invention relates to a method for the conversion of light hydrocarbons to hydrogen-rich gas in a vortex reactor. The method includes the steps of introducing at least one light hydrocarbon and oxygen into a reaction chamber, subjecting at least the light hydrocarbon feed gas to a reverse vortex flow, and converting said light hydrocarbons to hydrogen-rich gas with a plasma assisted flame (PAF).

In the method, the axial gas flow may be created by the steps of feeding gas in an axial direction into said reaction chamber and, optionally, accelerating said axial gas flow through a flow restriction. The circumferential gas flow may be created by the step of feeding gas into said reaction chamber in a direction tangential to a sidewall of said reaction chamber. In order to assist in the maintenance of the PAF, a third, oxygen-rich gas stream can optionally be introduced at the top of the reaction chamber.

The method includes generating plasma in said reaction chamber. Plasma generation may include the step of providing a sliding electrical arc in said reaction chamber, as discussed above.

The methods of the present invention may employ any of the reactors shown in the figures. In addition, each method of the present invention may optionally include the step of preheating one or more feed gases by counter-current heat exchange with the product stream from the vortex reactor.

If a vortex reactor with a movable electrode is employed, the method may further include the step of moving the electrode from a first, ignition position, to a second, operation position after ignition of the sliding arc in the reactor. In this method, operating conditions can be optimized, for example, by varying the distance between the movable electrode and the fixed electrode.

It is to be understood that even though numerous characteristics and advantages of the present invention have been set forth in the foregoing description, together with details of the structure and function of the invention, the disclosure is illustrative only, and changes may be made in detail, especially in matters of shape, size and arrangement of parts within the principles of the invention to the full extent indicated by the broad general meaning of the terms in which the appended claims are expressed.

What is claimed is:

1. A plasma reactor for conversion of light hydrocarbons to hydrogen-rich gas, comprising:
   a wall defining a reaction chamber;
   an outlet;
   a reagent inlet fluidly connected to the reaction chamber for creating a reverse vortex flow in said reaction chamber;
   a first electrode; and
   a second electrode connected to a power source for generation of a non-equilibrium sliding arc discharge in the reaction chamber.

2. The plasma reactor of claim 1, wherein the reaction chamber is substantially cylindrical.

3. The plasma reactor of claim 1, wherein said reagent inlet for creating said reverse vortex flow comprises a gas supply and one or more gas inlet nozzles oriented tangentially relative to the wall of the plasma reactor.

4. The plasma reactor of claim 3, wherein said reactor comprises first and second ends, the reagent inlet is located proximate to the first end, and the reactor further comprises a second inlet fluidly connected to the second end of said reactor.

5. The plasma reactor of claim 4, wherein the second electrode is positioned a substantially constant distance from the first electrode during operation of the reactor.

6. The plasma reactor of claim 5, wherein the first electrode is positioned proximate to the first end the reactor and at least a portion of the second electrode is positioned in the reaction chamber to create a gap between the anode and the cathode for initiation of a plasma generating electrical arc at said gap.

7. A plasma reactor as claimed in claim 6, wherein the first electrode also functions as a flow restrictor to assist in the generation of a reverse vortex flow.

8. A plasma reactor as claimed in claim 7, wherein the second electrode is a spiral shaped electrode.

9. A plasma reactor as claimed in claim 8, wherein a distal end of the spiral shaped electrode, relative to the position of the first electrode, terminates in a circular ring shape.

10. A plasma reactor as claimed in claim 7, wherein the second electrode is a combination of a spiral shaped electrode and a circular ring electrode.

11. A plasma reactor as claimed in claim 5, wherein the second electrode is a movable electrode which can be positioned in a first position to create a gap between the second electrode and the first electrode for electric arc ignition, and in a second position, after electric arc ignition, at a greater distance from said first electrode to provide a stable plasma in said reaction chamber.

12. A plasma reactor as claimed in claim 1, further comprising at least one heat exchanger for preheating at least one reagent for feeding to said plasma reactor by heat exchange with at least one product from said plasma reactor.

13. A method for converting light hydrocarbons to a hydrogen-rich gas comprising the steps of:
   providing a plasma reactor, said plasma reactor comprising:
      a wall defining a reaction chamber;
      an outlet;
      a reagent inlet fluidly connected to the reaction chamber for creating a reverse vortex flow in said reaction chamber;
      a first electrode; and
      a second electrode connected to a power source for generation of a non-equilibrium sliding arc discharge in the reaction chamber;
   introducing a gas selected from the group consisting of one or more light hydrocarbons, oxygen, an oxygen containing gas, and mixtures thereof, into said reaction chamber in a manner which creates a vortex flow in the reaction chamber;
   processing said light hydrocarbons using a plasma assisted flame; and
   recovering hydrogen-rich gas from said reactor.

14. The method of claim 13, wherein said reverse vortex flow is created by feeding a gas containing light hydrocarbons into said reaction chamber in a direction tangential to the wall of said reaction chamber.

15. The method of claim 13, wherein said reverse vortex flow is created by feeding an oxygen-rich gas into said reaction chamber in a direction tangential to the wall of said reaction chamber.

16. The method of claim 15, wherein said plasma reactor comprises first and second ends, the reagent inlet is located proximate to the first end, the reactor further comprises a second inlet fluidly connected to the second end of said reactor, and wherein at least some of said gas selected from the group consisting of one or more light hydrocarbons, oxygen, an oxygen containing gas, and mixtures thereof, is provided to the reaction chamber via the second inlet.

17. The method of claim 16, wherein the plasma reactor comprises a movable second electrode and said method further comprises the steps of igniting an electrical arc with said movable second electrode in a first position, and moving the movable second electrode to a second position farther from said first electrode than said first position for operation of said reactor.

* * * * *